United States Patent [19]

Tucker

[11] Patent Number: 5,690,725
[45] Date of Patent: Nov. 25, 1997

[54] FORMULATION FOR INFUSION OF FRUIT

[75] Inventor: Jeffrey W. Tucker, Traverse City, Mich.

[73] Assignee: Michigan Blueberry Growers Association, Grand Junction, Mich.

[21] Appl. No.: 610,182

[22] Filed: Mar. 4, 1996

[51] Int. Cl.[6] ........................................ A23B 7/08
[52] U.S. Cl. ..................... 106/217.7; 426/321; 426/639
[58] Field of Search ..................... 106/217.7; 426/321, 426/639

[56] References Cited

U.S. PATENT DOCUMENTS

| | | | |
|---|---|---|---|
| 4,350,711 | 9/1982 | Kahn et al. | 426/102 |
| 4,542,033 | 9/1985 | Agarwala . | |
| 4,775,545 | 10/1988 | Augustine et al. | 426/639 |
| 4,917,910 | 4/1990 | Hsieh et al. | 426/102 |
| 5,000,971 | 3/1991 | Hsieh et al. . | |
| 5,000,972 | 3/1991 | Nafisi-Movaghar . | |
| 5,073,400 | 12/1991 | Bruno et al. | 426/639 |
| 5,202,140 | 4/1993 | Perera et al. . | |
| 5,286,505 | 2/1994 | Hartson et al. . | |

OTHER PUBLICATIONS

Chuy & Labuza, "Caking and Stickiness, etc.", (1994), Journal of Food Science.

J. D. Ponting, "Osmotic Dehydration of Fruits, etc.", (1973), Process Biochemistry.

Hodge, Rendleman & Nelson, "Useful Properties of Maltose," (1972), American Assoc. of Cereal Chemists.

Primary Examiner—David Brunsman
Attorney, Agent, or Firm—Knechtel, Demeur & Samlan

[57] ABSTRACT

A formulation incorporating maltose or maltose corn syrup which allows increased levels of fructose or high fructose corn syrup to be infused into fruit or fruit pieces before drying. The formulation decreases the stickiness associated with high fructose infusion and agglomeration of fruit. Use of the formulation eliminates the need to oil coat fruit to keep it free-flowing. The formulation provides for retention of the original product character (size and shape) by requiring less quantity of water to be removed by dehydration since the fruit water is replaced with infiltrant. With a greater amount of the less costly infiltrant to be sold per amount of fruit, the cost of the product is thereby reduced. The texture of the finished product remains pliable due to the amount of humectant present. The sweetness intensity which would overwhelm the original flavor of the fruit product at these levels is reduced along with possible volatile retention.

8 Claims, No Drawings

FORMULATION FOR INFUSION OF FRUIT

I. FIELD OF INVENTION

The present invention relates to a formulation for infusing fruit and fruit pieces prior to dehydration. More particularly, the invention relates to a maltose or high maltose corn syrup and fructose or high fructose corn syrup formulation.

II. BACKGROUND AND PRIOR ART

Over the years, dried fruit has become increasingly popular with consumers. Typically, dried fruit is used in cereals, as an ingredient for baking, or eaten alone or in conjunction with nuts as a snack. Dehydration is an essential step in the processing of dried fruit. Prior to dehydration, fruit can be infused with an humectant. The goals of infusion are multifold: Infusion cuts the production cost of dried fruit by removing a percentage of the fruit's water content prior to the mechanical dehydration process, and also adds low cost bulk to the product; infusion helps preserve the fruit by reducing available water used by micro-organisms and in stability related reactions such as enzymatic and non-enzymatic browning; and perhaps most important from the consumers standpoint, infusion increases product quality, texture, color and flavor.

It is known in the industry that 10% to 20% moisture levels in the dried fruit provide the best product. It is also known that the lower the molecular weight of the infusion material, the greater its humectant properties. The greater the humectant properties, the easier and more cost effective it is to reach the 10% to 20% moisture levels. To reach these moisture levels, several processes have been used. Until present, glycerol, fructose, sucrose and corn syrup have been the principal humectants. For example, U.S. Pat. No. 4,917,910 to Hsieh, et al, discloses a process for infusing fruit with glycerol or propylene glycol. While the resulting fruit does reach humectant levels of 15% to 20% by weight, excess stickiness caused by this process requires that the fruit be tumbled to "declump" the fruit pieces. Also, glycerol alters the flavor of the fruit products as it contributes its own flavor to the fruit.

In another example, U.S. Pat. No. 5,073,400 to Bruno, et al, discloses a process of infusing raisins with fructose. The result is a fruit which has a natural softness and flavor retention. A shortcoming of this Patent, however, is that it does not address the problems of crystallization or excess sweetness that result from using high levels of fructose as a humectant. High levels of fructose alone result in a sweetness intensity that overpowers the natural flavor of the fruit. Further, using fructose alone as a humectant requires the producer to make a trade-off between fruit size and stickiness. High levels of fructose result in a dried fruit of acceptable size but the product is generally so sticky that it clumps, or agglomerates, and clogs food industry machinery. Therefore, an oil coating is generally required to keep the fruit "free flowing."

Other anti-agglomeration means such as forced hot air drying systems have also been used to reduce agglomeration. These systems, however, result in wrinkling, warping, and shrinking of the product due to non-uniform drying stresses. This in turn results in fruit product that lacks the appearance of the original fruit and is smaller in size.

Lower fructose levels reduce the stickiness to an acceptable level but the size and cost of the product is affected since dehydration with low levels of fructose causes excessive shrinking of the product resulting in low yields. Thus, an unappealing looking, small fruit product is produced which costs more to produce, as it takes more time to dehydrate the fruit and a greater number of fruit (piece count) to meet ingredient requirements, results.

The prior art generally provides processes for creating dried fruit which use glycerol or fructose alone. It does not necessarily focus on the infusion formulation. Therefore, the inherent problem of producing an economical dried fruit that has a natural fruit flavor, size, and texture while keeping stickiness to a minimum has not been adequately addressed. There is need, therefore, for an infusion formula which eliminates the common infusion problems of stickiness, sugar crystallization, and excess sweetness in highly infused fruit while at the same time decreases the cost of dehydration and produces dried fruit with a natural look and flavor.

III. OBJECTS OF THE INVENTION

Thus, it is an object of this invention to provide an infusion formulation for fruit that retains the original flavor, size, and shape of the original fruit.

It is another object of this invention to provide an infusion formulation which replaces a portion of the natural water content of the fruit with an infusion agent thereby resulting in less total volume loss associated with the removal of the water in the final dehydration step.

It is another object of this invention to decrease the sweetness associated with high humectant levels.

It is another object of this invention to decrease the stickiness and sugar crystallization associated with infusion.

It is another object of this invention is to eliminate the need to oil coat the fruit or fruit pieces.

It is another object of this invention to reduce the reliance on forced hot air drying systems, freeze drying, microwaving, vacuum drying, or other techniques used in the dehydration process.

It is another object of this invention to reduce the cost of producing dried fruit.

These and other objects and advantages of the invention will become apparent upon the reading of the detailed description of the preferred embodiment.

IV. DETAILED DESCRIPTION OF THE PREFERRED EMBODIMENT

The preferred embodiment of the inventive device is a formulation which can be used with present industry techniques for dehydrating fruit or fruit pieces. The inventive formulation enhances those processes. The present invention is a formulation consisting of maltose or high maltose corn syrup (HMCS) and fructose or high fructose corn syrup (HFCS). For convenience, throughout this description the use of the word maltose will also include HMCS and fructose will include HFCS.

Maltose is a disaccharide malt sugar found only in trace amounts in fruit. The humectant properties of disaccharides are less than monosaccharides and therefore, maltose has limited humectant activity by itself. Fructose, a ketohexose sugar, is commonly found in fruit. In fact, it is commonly referred to as fruit sugar. Increased levels of fructose are desirable in dried fruit. However, when used alone as a humectant, increased levels of fructose can cause excessive sweetness which overpowers the natural flavor of the fruit. High levels of fructose also cause excessive stickiness which results in clumping, or agglomeration, as well as crystallization of the fruit.

While maltose itself has limited humectant activity, the inventor has found that when combined with fructose, as the concentration of maltose increases the amount of infused fructose and displaced water both increase. This results in a less costly dehydration process since the increased surface water activity resulting from the displacement decreases the drying time. Also, increased sugars infused into the fruit result in a larger product, thereby maximizing the appearance of the original fruit and decreasing the number of fruit pieces required for a particular application. Maltose and HMCS are not as sweet as fructose: Therefore, this formula provides the ability to infuse fruit to a maximum level, yet the sweetness intensity found when using fructose alone is decreased by the addition of maltose or HMCS.

The formula works best for high water content fruits such as cherries, blueberries, grapes, strawberries and apples. However, high water content fruits such as oranges are not acceptable as the orange fruit cells are too large.

For example, using present processes, five to six pounds of blueberries yield approximately one pound of dried fruit product. With the inventive formulation, five pounds of blueberries yields approximately two and one-half pounds of dried fruit product when a 35% maltose concentration level is used infused to a level of 60° brix.

The maltose:fructose ratios can vary depending on the ultimate use of the final dried fruit product. For instance, at a 15% maltose concentration, with 85% fructose, fruit is produced that will not crystallize, i.e. sugar formation on the fruit surface, for at least three months. The resulting dried fruit is optimally used in low relative humidity atmospheres. Non-limiting examples of use for a 15% maltose concentration product include cereal and crunchy granola bars. Higher fructose levels give greater water activity reduction, but will be more sticky than with higher maltose levels.

At a 45% maltose concentration, a chewy yet soft and flavorful product results. Non-limiting examples of use for a 45% concentration product include direct consumption as a snack or in chewy granola bars. The inventor has found, however, that a 35% maltose concentration is optimal. A 35% concentration level results in natural flavor, size and texture, a minimum of stickiness, and provides for the widest range of product use.

While the best mode of the inventive formulation envisions a 35% maltose or HMCS concentration and 65% fructose or HFCS concentration level, acceptable ranges for practical application contemplate maltose concentration levels of 15% to 45% of the total syrup solids (with corresponding levels of fructose or HFCS). Within this range infused fruit and fruit pieces can be handled as free-flowing pieces. Therefore, coating of the fruit with an oil solution, dextrose, starch, etc., or vegetable oil to keep the product free-flowing is eliminated with maltose concentrations of 25% or above, depending on the storage conditions, and decreased within levels of 15% to 24%.

The minimal acceptable amount of maltose should be used for a particular end product. Maltose concentrations above 45% of the solids of the infusion formulation sacrifice product texture resulting in a drier, more chewy product at the same water activity.

The use of this formulation does not alter the ability to use flavors, colors, or food grade acids such as citric, malic, lactic, fumaric, tartaric, or ascorbic which are commonly used for organoleptic desirability.

Therefore, the present invention benefits the producer by increasing the amount of humectant infused into a piece of fruit thereby better maintaining the size and shape of the original fruit; improving flavor since sweetness intensity is decreased over the use of glycerol, fructose or high fructose corn syrup when used alone; decreasing crystallization and decreasing the cost of production by putting more sugar into each fruit piece thereby increasing volume size, decreasing the hours required to dry it since more water is displaced; and by eliminating the need for coating fruit with oil, or similar products, thereby eliminating one step in the dehydration process since no oil or tumbling is required.

While the invention has been described in conjunction with a specific embodiment, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A formulation for the infusion of fruit or fruit pieces comprising a disaccharide sugar substance and a ketohexose substance wherein the disaccharide sugar substance is between 15% and 45% of the total amount of the disaccharide sugar substance and the ketohexose substance.

2. A formulation according to claim 1 wherein the disaccharide sugar substance is selected from the group consisting of maltose and high maltose corn syrup.

3. A formulation according to claim 1 wherein the ketohexose substance is selected from the group consisting of fructose and high fructose corn syrup.

4. A formulation according to claim 1 wherein the disaccharide sugar substance is 35% of the total amount of the disaccharide sugar substance and the ketohexose substance.

5. A formulation for the infusion of fruit or fruit pieces comprising 15% to 45% of a disaccharide sugar substance and 55% to 85% of a ketohexose substance, the formulation being characterized by its ability to infuse fruit or fruit pieces before dehydration, resulting in the increased displacement of the natural water content of the fruit or fruit pieces.

6. A formulation according to claim 5 wherein the fruit or fruit pieces are selected from the group consisting of cherries, blueberries, grapes, strawberries and apples.

7. A formulation for the infusion of fruit or fruit pieces, before drying, such that the resulting product is fruit or fruit pieces which, after dehydration, retain their natural size, shape and consistency, and decreased crystallization comprising: 15% to 45% of a disaccharide sugar substance in combination with fructose or high fructose corn syrup.

8. A formulation according to claim 7 wherein the disaccharide sugar substance is selected from the group consisting of maltose and high maltose corn syrup.

\* \* \* \* \*